INVENTOR.
Thomas O. Kosatka,
BY George T. Haight &
George H. Simmons
Attys

United States Patent Office 2,806,725
Patented Sept. 17, 1957

2,806,725

FLUID SEAL

Thomas O. Kosatka, Chicago, Ill., assignor to Victor Manufacturing & Gasket Co., Chicago, Ill., a corporation of Illinois Application October 12, 1953, Serial No. 385,579

8 Claims. (Cl. 288—3)

This invention relates to fluid seals and has for its principal object the provision of a new and improved seal of this type.

It is a main object of the invention to provide a device capable of maintaining a tight seal with a rotating shaft against fluids which are at high temperatures.

Another object of the invention is to provide a sealing device in which the resilient shaft-engaging lip of the seal is composed of heat resistant elastomers such as silicone or polyacrylate rubbers.

Another object of the device is to provide in a fluid seal means for maintaining a sealing lip in seal-forming engagement with a shaft, notwithstanding that the material in the lip softens under the influence of the high temperature fluids engaging it.

Further objects of the invention not specifically mentioned here will be apparent from the detailed description and claims which follow, reference being had to the accompanying drawings in which a preferred embodiment of the invention is shown by way of example and in which:

Figure 1:
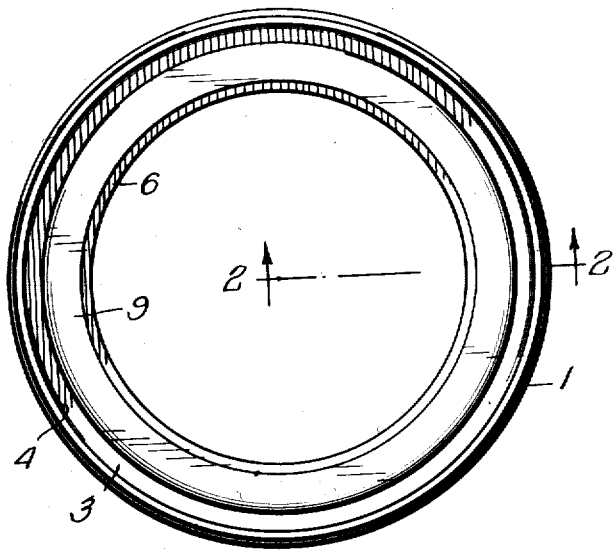
Fig. 1 is a plan view of the sealing device.
Figure 2:
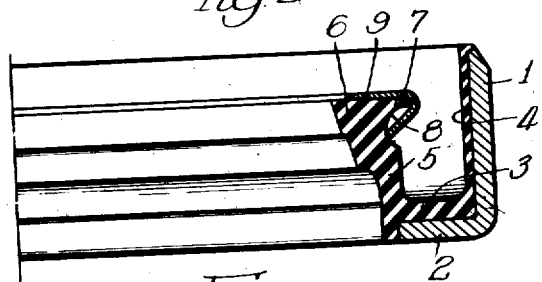
Fig. 2 is a cross sectional view taken substantially along the line 2—2 of Fig. 1, looking in the direction of the arrows and drawn to an enlarged scale.

Self-contained fluid seals are commonly used to form a fluid tight joint between a rotating or reciprocating shaft and a bore in a housing through which the shaft projects. Such sealing devices usually consist of a cuplike shell frequently composed of metal to which an elastomer is either chemically bonded or otherwise secured, the elastomer projecting inwardly from the cup and terminating in a lip that engages the shaft to form a seal therewith. Numerous devices, such as for example a garter spring, are frequently employed to encircle the sealing lip and tensioned to maintain it in seal-forming engagement with the shaft, even though that shaft be eccentric and/or misaligned with the axis of the bore in which the sealing device is positioned.

Elastomers of the type frequently used in such devices are impervious to oils, greases, coolants, and the like; however, these elastomers tend to harden as a result of continued exposure to heat and pressure. Hardening of the elastomer shortens the useful life of the device.

In modern automotive vehicles employing high horsepower engines, the lubricants in the transmissions and differentials become heated to temperatures above the safe working temperatures of the elastomers commonly used. This is particularly true of so-called automatic transmissions in which power is transmitted through a fluid. Because of this high temperature, elastomers now commonly used harden quickly and the life of the seal is unduly short.

There is available upon the open market elastomers such as silicone rubber and polyacrylate rubber which are capable of withstanding higher temperatures than can be successfully withstood by other elastomers. Such elastomers, when in contact with certain oils, have a tendency to soften and become flabby, and as a result of this characteristic the use of such material in an oil seal has presented problems notwithstanding the ability of the material to withstand high temperatures. In an oil seal employing such an elastomer as a sealing lip, tension supplied by a garter spring cannot be used to maintain the lip in seal-forming engagement with a shaft since the tendency of the material to soften and creep is accentuated by such tension and a garter spring will soon squeeze out the elastomer between it and the shaft and thereby shorten the life of the device. A sealing lip composed of an elastomer which tends to be softened by the hot oil engaging it will maintain a fluid tight seal with a shaft if that shaft is truly round and is properly centered in the bore in which the sealing device is mounted. Since shafts are oftentimes either slightly out of round or are misaligned with the bore or both, means must be provided on the sealing lip to aid in maintaining a fluid tight seal with the shaft even though the elastomer in the lip softens.

The present invention seeks to overcome these difficulties by providing on a sealing lip composed of silicone or polyacrylate rubber a means for maintaining the lip in seal-forming engagement with a shaft without the use of a garter spring or other device acting in tension upon the lip, notwithstanding that the material may soften and swell under the influence of the heated fluid with which it is in contact. To this end, in its preferred form, the device of the present invention consists of an outer shell preferably composed of metal, which shell is cuplike and to which a sealing element is either chemically bonded or secured in the manner shown in Patent 2,468,247, issued to John H. Victor on April 26, 1949. The sealing element includes a shaft-engaging lip upon which I have loosely mounted a retaining ring shaped to provide space into which the material in the lip can creep when softened by the fluid with which it is in contact. The retaining ring extends across the free end of the sealing lip into close proximity to the shaft and serves to confine the swelled material in the lip in such a manner as to maintain it in seal-forming engagement with the shaft, even though that shaft be of itself out of round and misaligned with the axis of the bore in which the sealing device is located.

The invention will be best understood by reference to the accompanying drawings wherein a typical example is shown and from which it will be seen that the housing of the sealing device contains an outer cylindrical wall 1 from one end of which an annular wall 2 projects inwardly. Preferably the shell is composed of metal such as steel, although if desired other materials, such as thermosetting resins, may be used.

Chemically bonded to the inner face of the annular portion 2 of the shell is the base portion 3 of a sealing element, which base portion includes a thin wall 4 engaging the inner surface of the outer cylindrical wall 1. A generally conical shaped neck portion 5 extends inwardly from the inner edge of the shell wall 2 and terminates in a shaft-engaging lip 6 from the free end of which a radially outwardly projecting portion 7 extends. The outer surface of the sealing lip is shaped to form a groove 8 terminating at its outer edge by the extension 7.

Loosely mounted upon the sealing lip 6 is a retaining collar 9 which is generally V or J shaped and extends across the free end of the lip around the extension 7 and thence diagonally into contact with the bottom of the groove. It will be noticed that there is within the retaining collar 9 an appreciable space normally unoccupied by the elastomer.

Figure 3:
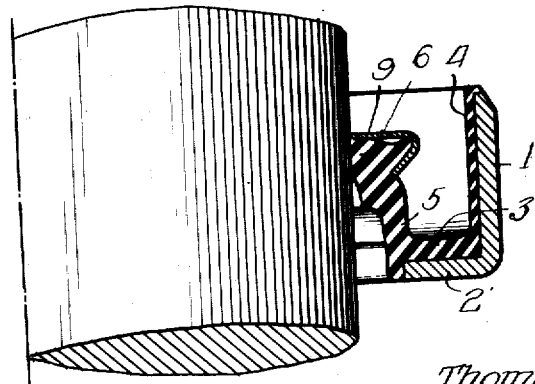
Fig. 3 is a view similar to Fig. 2, showing the sealing element engaging a shaft.

As will be seen in Fig. 3, the innermost edge of the retaining collar 9 is positioned in close proximity to the shaft preferably within ten to fifteen thousandths of an inch. Engagement of the sealing lip with the shaft distorts the extension 7 of the lip in the manner shown in Fig. 3. It will be noted that notwithstanding this distortion of the lip, there is still a space within the retaining collar 9 that is free from elastomer.

The sealing element of my improved device is composed of a heat resistant elastomer such as silicone or polyacrylate rubber, and when in contact with high temperature fluids of such character as to cause the elastomer to soften, creep, and become flabby, this creeping of the material is restrained by the collar 9 and a tight seal with the shaft is maintained.

Collar 9 may be composed of copper, brass, stainless steel, or a thermosetting plastic within the teachings of the invention. So long as the material of which the retaining ring is composed is softer than the metal in the shaft, the requirements of the invention are fulfilled. Because of the close spacing of the inner edge of this ring to the shaft, the ring may come in contact with the shaft, and if composed of a material that is softer than the shaft, the ring itself will be worn away and the shaft will not be scored by the ring. I have found that if copper is exposed to certain oils, such as, for example, sulphur bearing hypoids, at high temperature, and to elastomers such as silicone rubber or polyacrylate rubber, the copper will deteriorate rapidly. In such cases the ring must be composed of stainless steel or a thermosetting plastic, neither of which will be deteriorated by the oil. In other instances, such as for sealing transmission oils at high temperatures, rings composed of copper are eminently satisfactory.

Regardless of the material from which the ring is made, it must be loosely mounted upon the lip, that is to say not bonded thereto, and must provide space into which the softened and swelling elastomer can creep. If the ring were to be bonded to the lip, it would be fixed with respect thereto and creep of the elastomer would be directed away from the ring and the sealing pressure upon the shaft would be altered. I have found that bonding the ring to the lip will not produce the desired results. With the ring loosely mounted and provided with space into which the elastomer may creep, proper functioning of the seal has been achieved. Softening of the elastomer in the neck between the lip and base has not been detrimental.

When composed of silicone rubber or of polyacrylate rubber, the sealing element of the present invention can be molded and bonded to the shell by ordinary technique upon existing equipment. Following such molding, the element is cured at elevated temperature in the manner specified by the manufacturers of the material. When so cured, the sealing element is capable of withstanding fluids at temperatures up to 400° F., and the device of the present invention has been found to be capable of maintaining a fluid tight seal with a misaligned shaft under such conditions for a period of time long enough to meet the requirements of the trade.

While I have illustrated my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. A fluid seal comprising: a cuplike shell containing an outer cylindrical wall, a planar wall extending radially inwardly from one end thereof and having a central aperture therethrough; an annular elastometer sealing element fixed to said shell, an annular sleeve portion integral with said elastomer sealing element extending from the radially inner edge of said planar wall substantially concentrically of said cylindrical wall thereby defining a sealing lip adapted to engage a shaft; an extension on said sleeve portion projecting radially outwardly from the free end thereof, said sleeve portion being provided with a groove in its radially outer axial surface near its free end; a rigid unitary confining ring that is loosely fitted over the free end of the sleeve portion and extended around said extension into said groove to form a space between the opposed radial faces of the extension and the portion of the confining ring which is extended into the groove, said confining ring being adapted to maintain the sealing lip on said sleeve portion in sealing engagement with a shaft notwithstanding that the elastomer softens under the influence of heat and pressure.

extension and with its other portion spaced from the other face of the extension and engaging the bottom of the groove to provide a space within the ring adjacent the extension, into which space the extension is distorted by pressure placed upon the sealing element by a shaft.

2. A fluid seal as claimed in claim 1, in which the confining ring is composed of a material softer than that of the shaft to prevent scoring the shaft should it engage that shaft.

3. A fluid seal as claimed in claim 1, in which the confining ring is composed of a material softer than that of a shaft and contains an opening through which the shaft projects, which opening is but a few thousandths of an inch larger than the diameter of the shaft.

4. A fluid seal as claimed in claim 1, in which the confining ring is of generally V-shape in cross section and is disposed with one of its portions engaging one face of the 5. A fluid seal as claimed in claim 1, in which the elastomer element is composed of silicone rubber.

6. A fluid seal as claimed in claim 1, in which the elastomer element is composed of polyacrylate rubber.

7. A fluid seal as claimed in claim 1, in which the elastomer element is fixed in the shell by chemically bonding it to the planar and cylindrical walls thereof.

8. In a fluid seal, an elastomer sealing element comprising: an annular base portion; a neck portion projecting axially from the inner edge of said base; a sealing lip projecting axially and inwardly from the free end of said neck portion and adapted to engage a shaft and to form a fluid tight seal therewith; an extension of said sealing lip projecting radially outwardly from the free end thereof; the outer surface of said sealing lip being provided with a groove; and a rigid unitary confining ring extending from close proximity to the inner edge of said lip, across the free end of the sealing lip and said extension thereof, around the radially outer end of said extension and thence inwardly into said groove at an acute angle to that portion of the ring extending across the free end of the lip, said ring being loosely fitted upon the element and serving to confine the lip in seal-forming engagement with a shaft notwithstanding that the elastomer softens under the influence of heat and pressure.

References Cited in the file of this patent

UNITED STATES PATENTS

| | | |
|---|---|---|
| 1,988,652 | Gardner | Jan. 22, 1935 |
| 2,089,963 | Johnson | Aug. 17, 1937 |
| 2,093,572 | Padgett | Sept. 21, 1937 |
| 2,208,620 | Baisch | July 23, 1940 |
| 2,335,561 | Dodge | Nov. 30, 1943 |
| 2,345,588 | Dodge | Apr. 4, 1944 |
| 2,358,536 | Reynolds | Sept. 19, 1944 |

OTHER REFERENCES

"National Oil and Fluid Seals," Catalog No. 102–A; published in 1951 by National Motor Bearing Co. (Received in Patent Office October 22, 1952—page 16 relied on. Copy in Division 52.)

UNITED STATES PATENT OFFICE

CERTIFICATE OF CORRECTION

Patent No. 2,806,725                                                      September 17, 1957

Thomas O. Kosatka

It is hereby certified that error appears in the printed specification of the above numbered patent requiring correction and that the said Letters Patent should read as corrected below.

Column 4, line 15, beginning with "extension" strike out all to and including "by a shaft." in line 19; same column, line 32, after the words "face of the" insert the following:

> extension and with its other portion spaced from the other face of the extension and engaging the bottom of the groove to provide a space within the ring adjacent the extension, into which space the extension is distorted by pressure placed upon the sealing element by a shaft.

Signed and sealed this 5th day of November 1957.

(SEAL)
Attest:
KARL H. AXLINE

Attesting Officer

ROBERT C. WATSON
Commissioner of Patents